(12) United States Patent
Duarte et al.

(10) Patent No.: US 7,222,990 B2
(45) Date of Patent: *May 29, 2007

(54) HEADLIGHT APPARATUS EQUIPPED WITH AN INSERTIBLE COMPLEMENTARY MODULE, FOR A MOTOR VEHICLE

(75) Inventors: Marc Duarte, Bobigny (FR); Jean-Marc Nicolai, Bobigny (FR); David Myotte, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 309 days.

This patent is subject to a terminal disclaimer.

(21) Appl. No.: 10/771,991

(22) Filed: Feb. 3, 2004

(65) Prior Publication Data

US 2004/0184281 A1    Sep. 23, 2004

(30) Foreign Application Priority Data

Feb. 4, 2003    (FR) .................................. 03 01570

(51) Int. Cl.
*F21K 27/00*    (2006.01)

(52) U.S. Cl. .................. 362/265; 362/263; 362/516

(58) Field of Classification Search ............... 362/516, 362/263, 265; 439/76.1, 637
See application file for complete search history.

(56) References Cited

U.S. PATENT DOCUMENTS

| | | | | |
|---|---|---|---|---|
| 4,047,018 A | * | 9/1977 | Harris | 362/548 |
| 4,182,532 A | | 1/1980 | Walker | 296/210 |
| 4,674,015 A | | 6/1987 | Smith | |
| 5,597,232 A | * | 1/1997 | Ohashi et al. | 362/265 |
| 5,678,916 A | * | 10/1997 | Watanabe et al. | 362/465 |
| 5,975,715 A | * | 11/1999 | Bauder | 362/549 |
| 6,066,921 A | * | 5/2000 | Nakamura et al. | 315/71 |
| 6,102,550 A | | 8/2000 | Edwards, Jr. | |
| 6,161,951 A | * | 12/2000 | Yoneyama et al. | 362/516 |
| 6,364,515 B1 | | 4/2002 | Daub et al. | 362/548 |
| 6,382,823 B1 | | 5/2002 | Kibayashi | 362/548 |
| 6,390,657 B1 | | 5/2002 | Billot | 362/519 |
| 6,474,856 B2 | | 11/2002 | Billot | 362/548 |
| 6,536,920 B2 | | 3/2003 | Imachi et al. | 362/265 |
| 6,540,385 B2 | | 4/2003 | Ikeda et al. | 362/512 |
| 6,543,904 B1 | * | 4/2003 | Martinez-Gottschalk et al. | 362/29 |
| 6,550,935 B1 | * | 4/2003 | Ueno et al. | 362/263 |
| 6,672,747 B2 | | 1/2004 | Yamaguchi et al. | 362/549 |
| 6,690,114 B2 | | 2/2004 | Nakayama et al. | 315/77 |

(Continued)

FOREIGN PATENT DOCUMENTS

DE    196 54 190    7/1997

(Continued)

OTHER PUBLICATIONS

French Search Report dated Oct. 15, 2003.

*Primary Examiner*—Sandra O'Shea
*Assistant Examiner*—James W Cranson, Jr.
(74) *Attorney, Agent, or Firm*—Morgan & Finnegan, LLP

(57) ABSTRACT

A headlight apparatus has a lighting element with a connector base disposed in an aperture formed in the lighting element. The connector base has a set of terminals arranged to make contact with a set of electrical contact zones of a complementary module. Each electrical contact zone is so disposed, on a surface portion of an electronic printed circuit of the complementary module, as to be directly accessible for the corresponding terminal.

28 Claims, 3 Drawing Sheets

U.S. PATENT DOCUMENTS

| | | |
|---|---|---|
| 6,734,632 B2 | 5/2004 | Yamaguchi .................. 315/57 |
| 6,749,327 B2 | 6/2004 | Nishiyama .................. 362/548 |
| 6,767,121 B2 | 7/2004 | Bost et al. .................. 362/521 |
| 6,916,204 B2 * | 7/2005 | Duarte et al. ................ 439/607 |
| 2001/0030877 A1 | 10/2001 | Billot ......................... 362/548 |
| 2002/0067617 A1 | 6/2002 | Imachi et al. ............... 362/507 |
| 2002/0067619 A1 | 6/2002 | Ikeda et al. ................. 362/512 |
| 2002/0155738 A1 | 10/2002 | Ohsawa et al. ............... 439/98 |
| 2004/0042229 A1 | 3/2004 | Duarte et al. ............... 362/516 |

FOREIGN PATENT DOCUMENTS

| | | |
|---|---|---|
| EP | 1 136 749 A1 | 9/2001 |
| FR | 2 769 072 | 9/1997 |
| WO | WO02/10640 A1 | 2/2002 |

* cited by examiner

HEADLIGHT APPARATUS EQUIPPED WITH AN INSERTIBLE COMPLEMENTARY MODULE, FOR A MOTOR VEHICLE

FIELD OF THE INVENTION

The present invention relates to a headlight apparatus intended essentially for motor vehicles, the said headlight apparatus consisting mainly of a lighting element assembled with a complementary module which is adapted to be inserted in the apparatus and which is in the form of a casing. The complementary module comprises an assembly of electrical and/or electronic and/or mechanical elements which are directly adapted for operation of the headlight or for operation of accessory and/or complex functions associated with the headlight.

OBJECT OF THE INVENTION

Essentially, the object of the invention is to propose a particular solution in the construction of the electrical contacts between the lighting element and the complementary module; this solution has particular advantages in terms of ease of assembly of the lighting element with the complementary module, and, as a further advantage, in terms of bulk of the complementary module when it is assembled with the lighting element, or again simplicity of the moulds used to make the lighting element.

BACKGROUND OF THE INVENTION

In general terms, the field of the invention is that of motor vehicle headlights. Within this field various types of headlights are known, among which can essentially be found the following:
- parking lights, of low intensity and short range;
- passing or dipped beam lights, having a stronger intensity and with a range in the region of 70 metres along the road, which are used essentially at night, the distribution of their light beam being such that it avoids dazzling the driver of a passing vehicle;
- long range cruising lights, and complementary lights of long range type, which have a zone of vision along the road in the region of 200 metres, and which have to be extinguished when passing another vehicle so as not to dazzle its driver;
- improved lights of the dual function kind, which combine the functions of a passing light and a cruising light by incorporating a removable mask or shield;
- foglights.

The association in accordance with the invention between a lighting element and a complementary module may be performed with any one of these types of light. The complementary module may for example, in this connection, contain an electronic printed circuit of the Light Control System (LCS) type, which serves for management of so-called complex functions (FBL, DBL, DRL, Cordy etc.) for the light with which the electronic printed circuit is associated. The complementary module may also include a printed control circuit for governing a mechanical element of the actuator type. Nevertheless, the invention will be particularly described in the context of a headlight apparatus of the passing beam type, with a complementary module of the ballast type.

In the context of the invention, a ballast is a particular complementary module which is preferably contained in a headlight apparatus of the dipped beam or passing type which uses a discharge lamp as its light source. More particularly, in the invention reference is made to ballasts with a Xenon system, also referred to as high intensity discharge (HID) systems, which are necessary to create and maintain in force an electrical arc which is used in xenon lamps. An electronic module sets up a high voltage in the ballast to produce the electric arc in the light source used. In this type of light, a complementary module of the ballast type is therefore indispensable in order to provide the energy needed for proper functioning of the headlight.

However, integration of such a module within the headlight apparatus has to be done while having regard to the following restrictive conditions:
- it must be done using as simple an assembly (fitting) operation as possible;
- it must be as small as possible in size;
- in order to avoid any damage to the elements contained in the ballast, it must withstand high temperatures which may occur during operation of the headlight apparatus;
- it must take into account the need for transmission of electrical signals between the various elements of the headlight apparatus;
- the association between the lighting element and the complementary module must not involve sealing problems in connection with any of its components.

DISCUSSION OF PRIOR ART

In the current state of the art, there has been proposed, in particular, a headlight apparatus which attempts to have regard to the requirements listed above. One such headlight apparatus is shown diagrammatically in FIG. 1 of the accompanying drawings, to which reference is now made.

In FIG. 1, a headlight apparatus 100 consists essentially of a lighting element 101 and a ballast 102 of the xenon system type. In the lighting element 101, there is in particular a reflector 106 in which a light source 103 of the discharge lamp type is placed. The light source 103 produces a light beam which leaves the lighting element 101 at the level of an outlet surface 108 that constitutes the front part of the lighting element 101. The light source 103 rests on a lamp holder element 104 and is connected to a high tension module 105, which supplies it with power.

The high tension module is supplied with power by means of a first electrical link 107 constituting an outlet bundle and preferably screened, which emerges from the lighting element 101 through a first aperture formed in a lower face 109 of the lighting element 101, in which there is disposed a first connector base 110. This first connector base 110 is adapted to receive a first connector 111 of the ballast 102. The latter includes a second connector 112 which is associated with a second connector base 113 disposed at the level of a second aperture, which is formed in the lower face 109 of the lighting element 101. A second electrical link 117, constituting an input bundle, is connected to the second connector 112; it enables different electrical signals, in particular a power supply signal for the ballast and various control signals from the vehicle, to be conveyed.

The ballast 102 and lighting element 101 are secured together between the lower face 109 of the lighting element 101 and an upper face 115 of the ballast 102, at the level of an aperture 114 which is formed in at least part of the lower face and rear face of the lighting element 101, that is to say approximately under the assembly that consists of the reflector 106, the lamp holder element 104 and the high tension module 105. The ballast 102 is fixed to the lighting element 101 by means of at least two screws 116, which are disposed vertically in apertures provided for this purpose.

The choice of disposition for the ballast 102 is made in particular with regard to which zone of the headlight apparatus is the least hot. Generally, this zone corresponds to the zone situated under the reflector element 101, which is also quite accessible and consequently makes fitting easier: it is at this location that heat produced by the light source 103 is weakest, and the lower part of the lighting element 101 is easier to reach for access than is, for example, the rear part.

Assembly of the lighting element and complementary module together, such as has just been described, does have a certain number of disadvantages, as follows.

First of all, the fact that the connector bases 110 and 113 are disposed vertically on the rear face 109 of the lighting element 101 gives rise to a first problem: this is that the mould in which the lighting element 101 is made opens in a horizontal direction, and the need to be able to provide vertical connector bases makes it necessary to provide drawers in the mould which is used. Since this mould is used for a series of headlight elements, including those operating with a light source of the halogen type, this disadvantage, besides imposing penalties in terms of complexity in making the mould, unhelpfully increases the cost of the set of headlight elements.

The presence of two connectors is also a problem in itself: in this connection, the more connectors there are, the more delicate is the fitting operation to perform and the longer it takes to do.

A third problem encountered with headlight apparatuses in the current state of the art, where they are associated with a complementary module, is that they are relatively bulky, because the complementary module 102 has a considerable height due to its inherent design.

A fourth problem met with in headlight apparatuses in the current state of the art, where they are associated with a complementary module, lies in the complexity of the fitting operation, in particular because of the fastening means which are used: in the state of the art as described, it is necessary to make use of at least two screws to fasten the lighting element 101 and the ballast 102 together. The fewer screws there are, the quicker and simpler is the fitting operation.

DISCUSSION OF THE INVENTION

The apparatus according to the invention responds to the problems just discussed. In general terms, the invention proposes a lighting element associated with a complementary module, which is very easy to assemble as compared with those in the current state of the art, in particular by reducing the number of elements playing a part in the electrical connection of the complementary module to the lighting element, while in certain embodiments, the invention eliminates the need to provide drawers for placing connector bases in the mould in which the lighting element is made.

The invention also proposes different organisation of the electrical links which will henceforth enable only a single connector base to be used on the lighting element. In addition, an arrangement can be provided for the complementary module which enables the increase of the overall volume of the headlight apparatus to be limited, especially in the direction of height, while improving its sealing. Finally, the number of fastening means are reduced.

To this end, in the invention, a solution is proposed which is different from that described in FIG. 1, as regards the connection between the headlight apparatus and the complementary module. In the invention, electrical contact zones are disposed on the surface of an electronic printed circuit (also referred to in this Application as a circuit board) of the complementary module, in such a way that it is no longer necessary to provide any connector on the complementary module. It is also arranged in consequence that the connector base attached to the lighting element is adapted, in particular by equipping the latter with terminals which are adapted to make contact with the various surface contact zones of the complementary module when the latter is fixed to the lighting element and ready to operate.

In one particular example of an embodiment of the apparatus according to the invention, an aperture or opening is formed in the reflector, and the various elements of the apparatus, such as the complementary module, are so organised as no longer to project out of, or projects only by a minimum amount out of the aperture, at least in the direction of the height. It is also arranged that the complementary module is secured to the lighting element by means of a single fastening element, for example a screw disposed at the level of a contact plane defined by a front face of the complementary module and a side wall (or lateral wall) of the aperture. It is at the level of this contact plane that the connector base enters into contact with the contact zones of the electronic printed circuit of the complementary module.

Accordingly, the invention essentially provides a headlight apparatus, including a lighting element comprising, in particular, a reflector, a light source and a housing which has a set of side faces, comprising a rear face, a lower face and an upper face. The lighting element has at least one connector base disposed in an aperture formed in the lighting element, the said connector base comprising a set of terminals which are adapted to come into contact with a set of electrical contact zones of a complementary module, each electrical contact zone being disposed in such a way that it is directly accessible, for the terminal with which it is to make contact, on a surface portion of an electronic printed circuit board of the complementary module.

The headlight apparatus according to the invention may, in addition to the main features mentioned in the last paragraph above, have one or more of the following secondary features.

The electrical contact zones are distributed over at least two faces of the complementary module.

The electrical contact zones are disposed on only one face of the complementary module.

The connector base includes an aperture, in which the electronic circuit board is rooted or inserted and in which the set of terminals is disposed.

The electrical contact zones are grouped in a first set of electrical contact zones, disposed on a first face of the electronic printed circuit board, and a second set of electrical contact zones disposed on a second face of the electronic circuit board, each contact zone of the first set of contact zones being connected electrically to a contact zone of the second set of contact zones.

The set of contact zone and the set of terminals are associated in one-to-one relationship.

The headlight apparatus includes means co-operating with each other for centring the set of contact zones with respect to the set of terminals when the electronic circuit board comes to be inserted in the connector base.

Contact between each contact zone and the terminal with which the said contact zone is adapted to connect is effected by means of at least one intermediate member which is at least partly conductive, for example of metal.

The intermediate member includes a first set of lugs in contact with the electrical contact zones of the first face of the electronic circuit board, and a second set of lugs in contact with the contact zones on the second face of the electronic circuit board, the two sets of lugs being joined at a common end which is sufficiently thin to be inserted and held between two terminals of the connector base.

The intermediate member is in electrical continuity with, and in particular is fixed to, electrical contact zones of the electronic circuit board, the fastening together being obtained for example by welding, brazing or adhesive bonding.

In another version, the said intermediate member or members is or are fixed to the electronic circuit board, in particular by brazing or adhesive bonding, in such a way as to be in electrical continuity with the electrical contact zones of the said electronic circuit board. There may be intermediate members in the form of projecting elements disposed on at least one of the faces of the electronic circuit board. In practice, it is possible to arrange a conductive pin on an electrical contact zone of the printed circuit, on either one of its faces or on each face.

The complementary module is a ballast of the xenon system type, or a module comprising an electronic printed circuit for managing at least one is function associated with the lighting element.

The lighting element has a single connector base.

The complementary module and the lighting element are secured to each other by means of a single screw (or several screws), and/or by one or a plurality of clipping means for clipping the complementary module on the lighting element.

The screw is, or the screws are, preferably of the self-tapping type adapted to be passed into a fastening element situated on a lower part of the complementary module, so as to be inserted into the lighting element.

The complementary module and the lighting element are secured to each other by means of a spring for exerting pressure on a rear portion of the complementary module, whereby to maintain the electronic circuit board rooted in the aperture of the connector base.

The headlight apparatus has an aperture formed in at least part of the lower face and a portion of the rear face of the lighting element, the connector base being disposed in an aperture formed in the rear face of the lighting element at the level of the aperture.

The headlight apparatus includes a first sealing means of the gasket type disposed in the aperture in such a way as to envelop a connecting terminal of the complementary module, thereby sealing the headlight apparatus.

The first seal is of the lip seal or compression seal type.

The headlight apparatus includes a second sealing means of the gasket type disposed in the aperture, whereby partially to envelop the connector base, thereby sealing a junction between the connector base and the complementary module.

The headlight apparatus includes a third sealing means of the gasket type, disposed between a heat sink, constituting a lower portion of the complementary module, and a cap of the complementary module.

The headlight apparatus has a single power supply input for receiving a set of signals from outside the headlight apparatus, the said signals being transmitted to the connector base through a first conductive link, while a second conductive link, internal to the lighting element, ensures transmission of signals between the connector base and a high tension module associated with the light source.

The headlight apparatus includes at least one pair of assembly elements consisting of a guiding slide and a projecting element, the projecting element being adapted to be inserted in at least one end of the guiding slide with which it is paired, and to slide in the said guiding slide, each of the assembly elements in a pair of assembly elements being disposed either on the lighting element or on a complementary module adapted to be associated with the lighting element, the two assembly elements in an assembly pair not being disposed together on the lighting element or on the complementary module.

The headlight apparatus has two pairs of assembly elements.

Each guiding slide is disposed on the lighting element, and in that each projecting element of a pair of assembly elements is disposed on the complementary module.

The guiding slides are disposed on walls of the lighting element which define the aperture.

The set of contact zones and the set of terminals enter into contact with each other when at least one projecting element in an assembly pair is at the end of its course of travel within the guiding slide with which it is associated.

In a first modified version of the invention, insertion of the printed circuit as mentioned above is reversible: the circuit board is removable. This feature is of advantage because it enables defective printed circuits, for example, to be easily replaced.

In a second variant of the invention, the printed circuit is no longer necessarily removable. On the other hand, the apparatus according to the invention includes at least one additional component which is mounted removably on the casing, and which carries the connector base and the complementary module. In the event of any operating problem, it is then the assembly consisting of this component, the connector base and the module which is replaced. This additional component is mounted in any appropriate way on the casing, of which it can constitute a portion or an extension (removable).

Preferably, elastic means are arranged between the connector base and the complementary module and/or the lighting unit. Their function is, due in particular to their form and their elasticity, to compensate for clearances that may exist between the various elements, so as to prevent any relative movement between these latter.

A further aspect of the invention provides a motor vehicle equipped with a headlight apparatus, including a complementary module which includes the main features set forth above, with at least one of the features referred to above as secondary features.

The invention and its various applications will be understood more clearly on a reading of the following detailed description, and by studying the accompanying drawings. The latter are presented by way of example only and are in no way limiting of the invention.

DESCRIPTION OF PREFERRED EMBODIMENTS OF THE INVENTION

In the various Figures of the drawings, the elements that are common to more than one of the Figures will retain the same reference symbols in each Figure.

Figure 2:
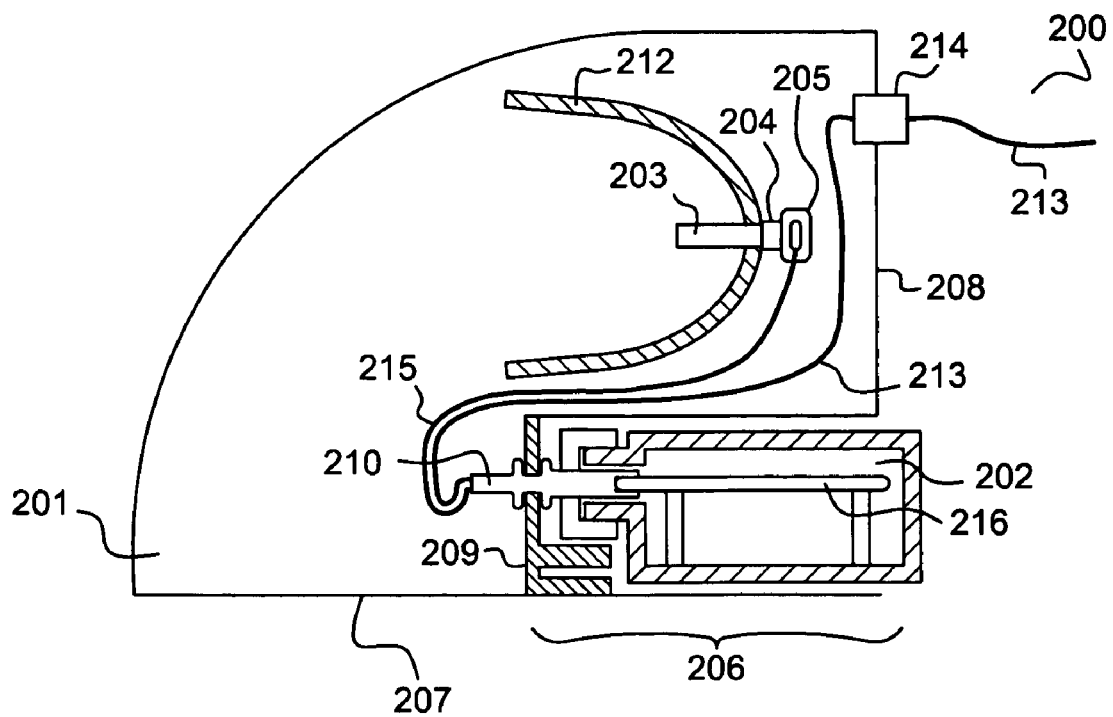
FIG. 2 is a diagrammatic front elevation, in cross section, showing a combination of a headlight unit and a complementary module according to the invention.

FIG. 2 shows an apparatus 200, or headlight unit, according to the invention, in vertical cross section. The unit 200 comprises in particular a lighting element 201 and a complementary module 202 of the HID ballast type, which may in particular include an electronic printed control circuit 216. As in the state of the art, the lighting element 201 contains, in 20 particular, a reflector 212 in which a light source 203 of the discharge lamp type is located. The term "reflector" here means a reflective surface capable of emitting light signals that are incident on it. The light source 203 produces a light beam which leaves the lighting element 201 at the level of an output surface 208 which constitutes the front part of the lighting element 201. The light source 203, which lies on a lamp holder element 204, is connected to a high tension module 205 which supplies it with power.

An opening or aperture 206 is formed in at least one part of the lower surface 207, and a portion 209 of a rear surface 208 of the lighting element 201, the orientations of these surfaces being defined by considering the headlight unit in a conventional operating position on a motor vehicle, the output surface for the light beam constituting the front face of the lighting element. The opening 206 is substantially in the form of a parallelepiped in the example described, but its form could be different in other embodiments of the invention. The headlight unit 200 aims to limit any additional size due to the addition of the complementary module 202 of the ballast type. Two solutions are proposed, and each of these two solutions may be applied by itself or in association with the other solution, according to various embodiments of the headlight unit 200.

The first solution consists in disposing, for example by clipping and with a little clearance, a connector base 210 on a rear portion 209 of the lighting element 201 which is situated at the level of the opening 206. The junction of the connector base 210 with an appropriate contact zone of the complementary module can thus be made in a vertical plane, referred to as the contact plane or junction plane, that is to say by displacing the ballast 202 in a horizontal direction towards the lighting element 201, and no longer in a vertical direction as was the case in the example described with respect to FIG. 1. This junction will be more particularly described with respect to FIGS. 3 and 4. Thus, the upward extension of the size of the apparatus, which was formerly due to the presence of a plurality of connector bases and connectors in a horizontal junction plane, has disappeared. With this new arrangement, the general height of a headlight unit including a complementary module is advantageously reduced.

A slight increase in the width of the unit could however also be considered. This is why, in the invention, a second solution is proposed which may be complementary to the first solution, and in which the opening 206 is slightly extended horizontally, that is to say it advances a little further below the reflector 212. In this connection, if it is not possible to increase the size of the opening in the direction of height without coming too close to the reflector 212, there is nothing to prevent it being extended in the direction of length in order to make it deeper.

Moreover, the fact that henceforth there is a vertical contact plane enables sealing of the junction to be improved; in this connection, water of condensation formed within the lighting element 201 is able to infiltrate along a horizontal junction but not along a vertical junction. In the examples just described, the clearance between the connector base 210 and the portion 209 of the rear face can be omitted, for example by making use of a flexible element which may for instance be a gasket, fixed with respect to the ballast 202.

In addition, in the invention, an organisation of various conductive electrical connections is proposed which enables the number of connector bases 210 to be limited to one. In this connection, a first electrical connection 213 is provided, constituting an inlet bundle which conveys a set of power supply and control signals from outside the headlight unit 200 to the connector base 210. This first electrical connection 213 enters the lighting element 201 through an aperture 214 so as to be connected on the connector base 210. A branch connection at the level of the connector base 210 enables a second electrical connection to be made in the form of an output bundle, which enables the light source 203 to be supplied with power.

Figure 3:
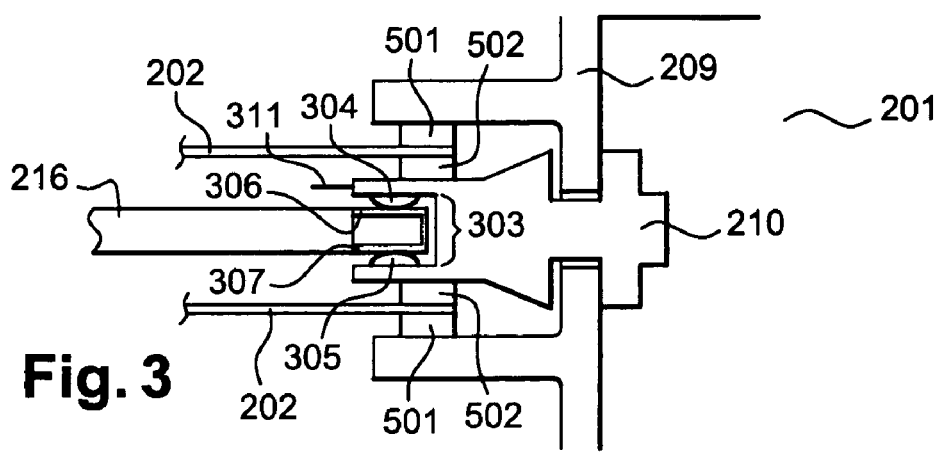
FIG. 3 is a diagrammatic view of the assembly, in a first embodiment of the invention, between the headlight unit and the complementary module.
Figure 4:
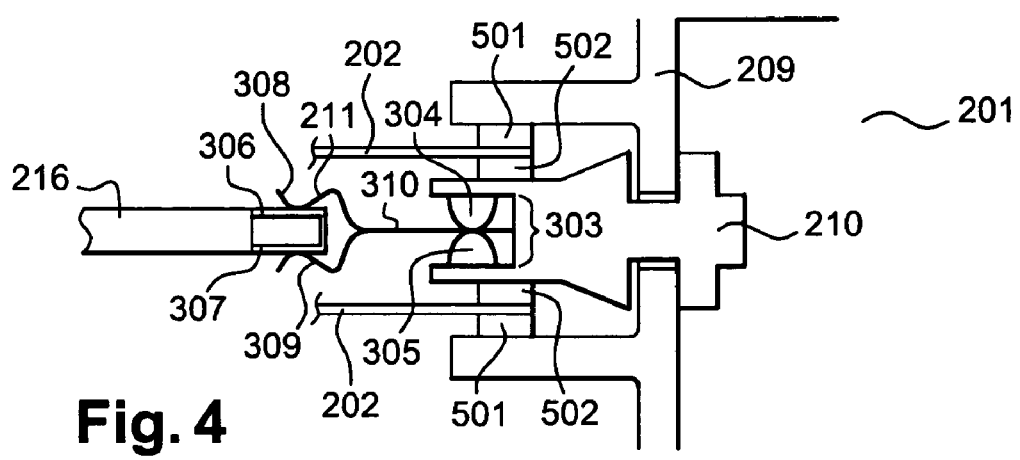
FIG. 4 is a diagrammatic view of the assembly, in a second embodiment of the invention, between the headlight unit and the complementary module.

Reference is now essentially made to FIGS. 3 and 4, which show two examples of embodiments of electrical connections between the complementary module 202 and the headlight unit 201. In these two Figures, it can be seen that the connector base 210 is fixed in a floating manner on the portion 209 of the rear surface 208 of the lighting element 201. A first seal 501 and a second seal 502 are disposed between the rear portion 209 and the connector base 210. The function of the first seal 501 and second seal 502 will be described in detail later herein. One end, accessible from outside the lighting unit 201, comprises an aperture 303. In an upper part of the aperture 303, there is arranged a first set 304 of terminals, and in a lower part of the aperture 303, there is arranged a second set 305 of terminals. A terminal is an element for electrical connection which consists of one or more conductive elements of the metallic lug type, slightly deformable in order to allow a support to slide on it without too much resistance, the support comprising a set of contact zones, in an aperture in which the said terminal is disposed; the deformation of the terminal is elastic, in such a way that it remains applied on the zone of the support at the level of which it is put, the said zone corresponding preferably to a contact zone of the support.

The aperture 303 is arranged to receive one end of the electronic circuit board 216. In accordance with the invention, at least one set of electrical contact zones is disposed on this end. For the examples shown, a first set of contact zones 306 and a second set of contact zones 307 are shown, respectively on an upper part and on a lower part of the electronic circuit board 216. Since FIGS. 3 and 4 are cross sectional views, they show only a single connecting element and a single contact zone of the assemblies to which they relate. In the invention, the sets of terminals do in fact consist of a juxtaposition of terminals, which may be identical or of different types, and which are disposed in line with the visible terminal, parallel to the plane which can be seen in FIGS. 3 and 4. In the same way, the sets of contact zones consist of a juxtaposition of contact zones which are preferably identical, and which are disposed in line with the visible contact zone, parallel to the plane which can be seen in FIGS. 3 and 4. The first set of contact zones 306, disposed on the upper part of the electronic circuit board 216, can be seen in FIG. 5.

In accordance with the invention, the various contact zones 306 and 307 are disposed directly on the electronic circuit board 216, that is to say the electrical contacts are made bare on the surface of the electronic circuit board 216. In some embodiments, they may be incorporated within the initial thickness of the electronic circuit board, like the contact planes of an integrated circuit in a wafer. Thus, when the electronic circuit board 216 is inserted in the aperture 303 of the connector base 210, the terminals are in direct contact with the various contact zones. Preferably, the relationship between the terminals and the contact zones is one to one, that is to say each contact zone is touched by a single terminal.

In one particular embodiment, each first contact zone of the first set 306 of contact zones is connected electrically to a second contact zone in the second set 307 of contact zones, the first contact zone and the second contact zone being preferably situated one above the other. The electrical connection between two contact zones which are electrically connected together is ensured by internal strips or bridges of the electronic circuit board 216. In this case, a similar configuration is provided for the sets of terminals, in which each first terminal of the first set of terminals 304 is electrically connected to a second terminal in the second set 305 of terminals, the first terminal and second terminal being preferably situated one above the other. This arrangement ensures a good quality of electrical connection between the terminals and the contact zones.

Figure 5:
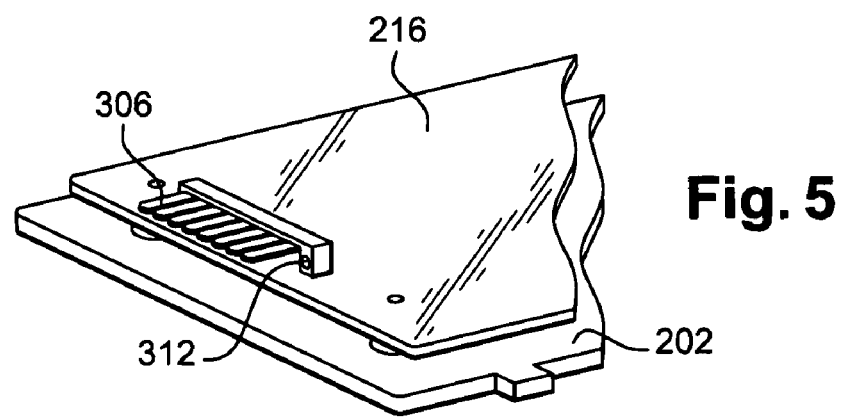
FIG. 5 is a scrap view in perspective, showing one example of an arrangement in which the electronic printed circuit board is arranged in the apparatus of the invention.

As shown in FIG. 4, the electrical connection between each contact zone and the terminal with which it is associated can be effected by means of an intermediate member 211 which is electrically conductive and which is composed for example of a first set of contact lugs 308 and a second set of contact lugs 309, the contact lugs of one set being disposed in line with the visible contact lug, parallel to the plane visible in FIG. 5. One contact lug is provided for each contact zone. The two sets of lugs join at the level of a retaining bar 310 which is arranged to be inserted between the first set of connecting elements 304 and the second set of terminals 305, so as to ensure that electrical contact is made between the contact zones and the appropriate terminals.

Co-operating means for centring the set of contact zones with respect to the set of terminals, when the electronic circuit board has been inserted into the connector base, are provided in the invention. Such means may in particular make use of one or more guide pins 311 on the connector base 210, these guide pins being arranged to fit within an appropriate aperture 312, which can be seen in FIG. 5.

In further embodiments, it is arranged according to the invention that there is only one set of terminals and/or of contact zones, for example on a single face of the electronic circuit board 216.

Figure 6:
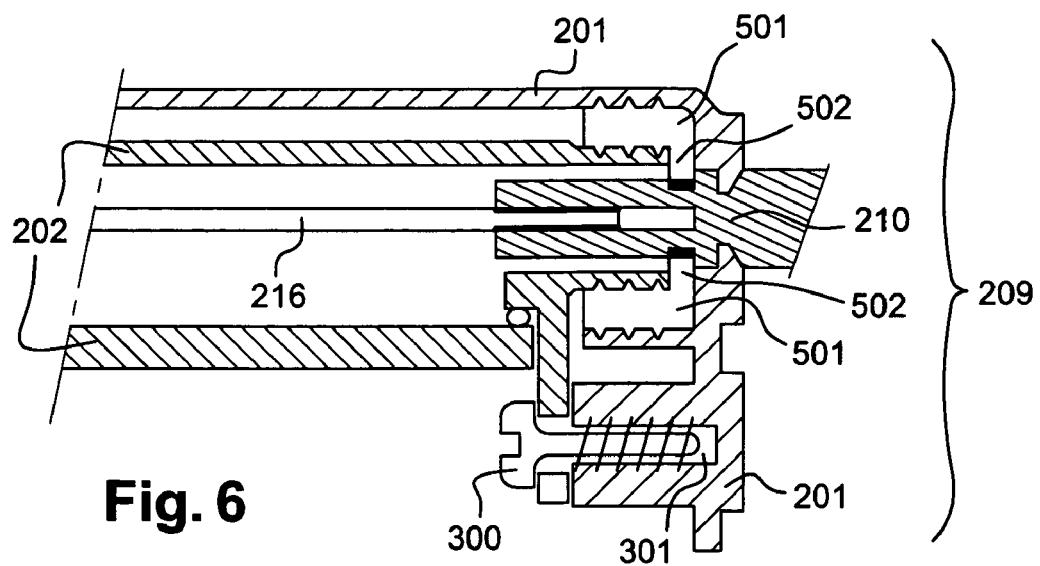
FIG. 6 is a more detailed view, showing the various elements which are used in securing the headlight unit and complementary module together.
Figure 7:
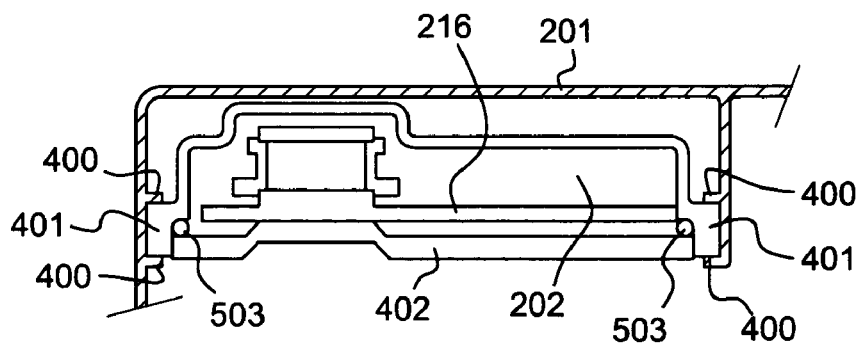
FIG. 7 is a diagrammatic elevation from the left hand side, showing in cross section a combination of a headlight unit and a complementary module according to the invention.
Figure 8:
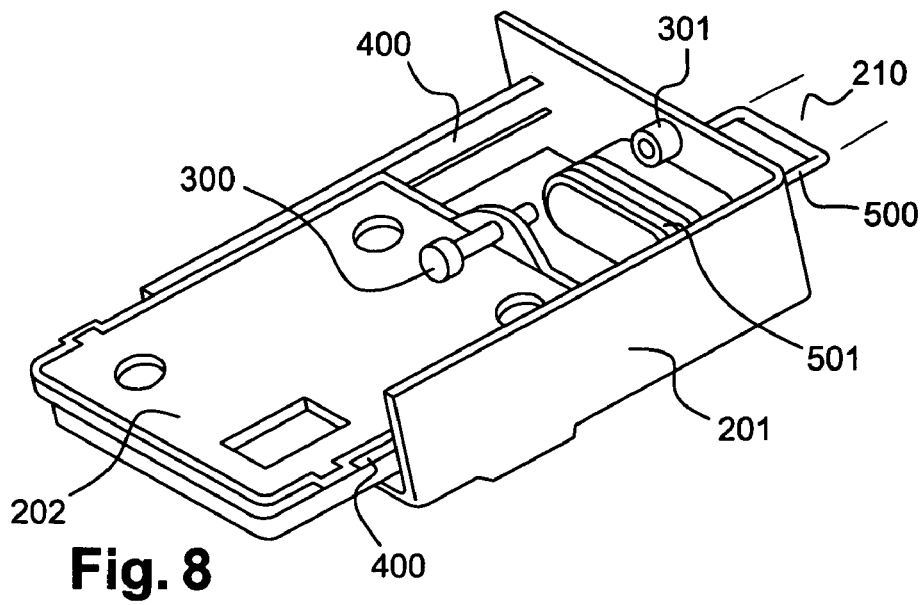
FIG. 8 is a diagrammatic perspective view of part of the apparatus of the invention.

Reference is now made essentially to FIGS. 6, 7 and 8, which show, in particular, the various elements which play a part in the securing together between the ballast 202 and the lighting element 201.

Figure 1:
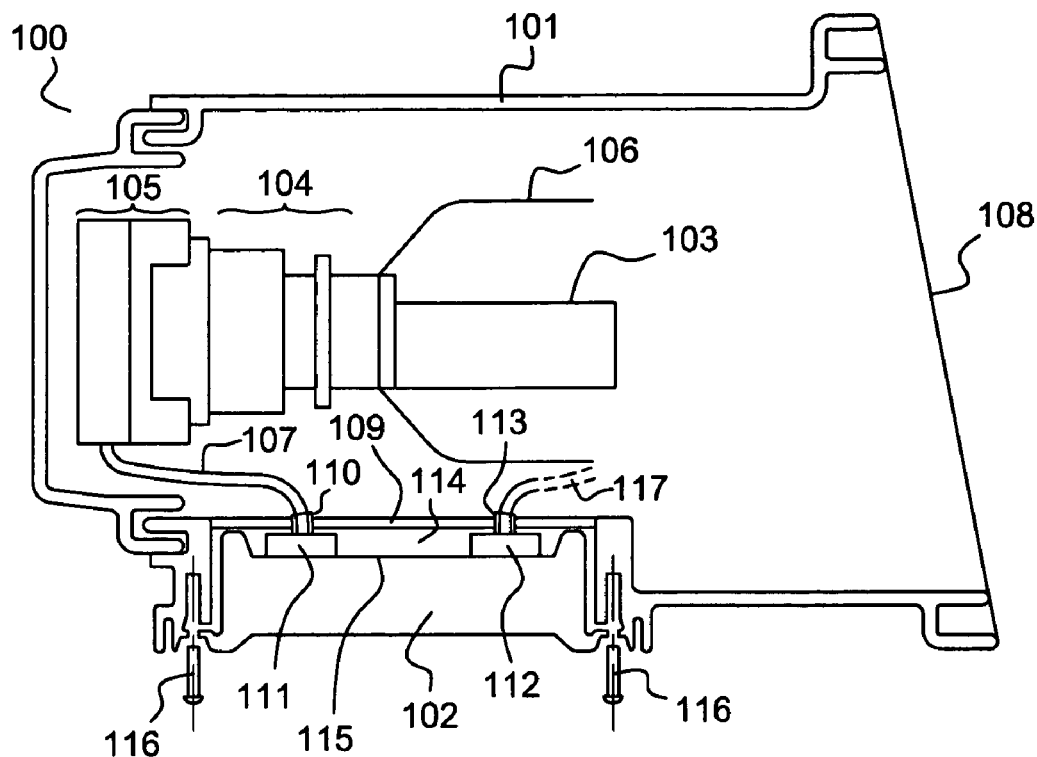
FIG. 1, which has already been described above, shows a combination of a headlight unit and a complementary module in the state of the art.

In FIG. 6, apart from various elements which are already present in FIG. 1, there are shown a screw 300, which is preferably a self-tapping screw and which, after being introduced into a fastening element situated on the lower part of the ballast 202, is inserted in the portion 209 of the rear face, at the level of the aperture 206, of the lighting element 201 (shown in hatched lines), and the side portion of the ballast 202 (shown in outline) serving as a junction plane. The junction consisting of the screw 300 and the threaded hole 301 is preferably centred on its width, as can be seen in FIG. 8. It is disposed below the link which is established between the connector base 210 and the set of contact zones. In a further example, the head of the screw 300 comes directly, without the screw having been introduced into a fastening element, into engagement on a projecting portion of the ballast 202, so as to maintain it on the lighting element 201.

A device for automatically centring the set of terminals on the set of contact zones is provided: it appears in FIG. 8 in the form of two centring pins 500 disposed on the connector base 210; these centring pins are arranged to give correct orientation of the set of contact zones towards the appropriate terminals of the connector base 210, when the lighting element 201 and ballast 202 are telescoped together. In yet further embodiments, the centring pins may be disposed on the complementary module 202, or else may be replaced by chamfers disposed on the ballast 202 and/or the lighting element 201.

In a still further embodiment, the screw 300 could be replaced by a further mechanical fastening means, for example a compression spring which would be disposed behind the ballast 202, so as to exert on the latter a horizontal thrust to maintain operational the connection between the set of contact zones and the set of terminals.

In one particular version of the invention, guide rails 400, or slides, which can be seen in FIGS. 7 and 8, are provided on the lighting element 201 at the level of the aperture 206. They are adapted to guide, with a minimum of clearance, the horizontal straight line movement of the ballast 202 when it is being installed in the unit 200, the purpose of this being to facilitate assembly. Projections 401, or protuberant elements, the size of which is large enough to enter into the guide rails 400, are provided for this purpose on the side walls of the ballast 202. The guide rails 400 also act as supports for the ballast 202, which can permit the use merely of a single screw 300.

In the various embodiments of the apparatus according to the invention, one or more pairs of assembly elements can be provided, each pair consisting of a guiding slide 400 and a protuberant element 401. The guiding slides may be disposed on the lighting element 201 or on the complementary module 202, with the associated projection, that is to say the one which is part of the same pair of assembly elements, then being disposed on the element which does not support the slide 400. In the various embodiments envisaged for the apparatus according to the invention, the guiding slides 400 may be disposed on any face whatsoever of the lighting element 201 or the complementary module 202, and may be at the level of the aperture 206 where it exists.

When a projection 401 slides along a guide slide 400, it reaches the position in which it is stopped, for example by a mechanical stop element, corresponding to the final position of the complementary module, that is to say to its working position. In the invention it is arranged that, when the complementary module reaches its stop position, the set of contact zones is correctly inserted in the set of terminals, that is to say the mechanical stop element and the electrical connection take effect at the same instant.

In order that the electrical connection will be made satisfactorily, the various centring means may be disposed in such a way that they also act at that instant.

In one particular example of an embodiment of the apparatus according to the invention, the guiding slides 400 are arranged in the actual interior of the lighting element 201, with the complementary module then being arranged to be contained in the lighting element 201, which has an advantage in terms of sealing of the apparatus according to the invention.

In a further example, the guiding slides 400 are progressively tapered so that they apply frictional braking to, and then stop in the stop position, the progression of the projections 401. The projections 401 can thus be stopped in the guiding slides 400, so that they are thereby able to ensure that the complementary module 202 is held on the lighting element 201 without making use of any additional fastening means.

In order to ensure perfect sealing of the apparatus according to the invention, various seals may be present, as follows.

The first seal 501, of the lip seal type, which has already been seen in FIGS. 3 and 4 and which appears in FIGS. 6 and 8, is disposed in the opening 206 so that it envelops the ballast 202 in the region of its front face, thereby sealing the headlight unit 200 from the outside environment. The first seal 501 may be terminated by a membrane 502 which can be seen for example in FIG. 6, and which provides sealing between the ballast 202 and the connector base 210. This membrane 502 may take the form of a second seal, dissociated from the first seal 501 and preventing any ingress of liquid between the ballast 202 and the lighting element 201 in the region of the fastening, with a clearance, of the connector base 210 on the lighting element 201.

A third seal 503, which can be seen in FIG. 7, seals the ballast 202 from outside; it is arranged in the region of a junction between a heat sink 402 which constitutes the lower face of the ballast 202 and the projections 401 which are arranged on the side walls of the ballast 202.

In this way it is possible to provide sealing means of the gasket type between the connector base 210 and the conducting connection 215 shown in FIG. 2.

In order to improve the sealing still further, a further piece, for example of rubber, is added so as to surround the portion of the connector base 210 which lies within the lighting element 201 and the electrical connections which come out of it; the rubber piece is, at one end, in contact with the portion 209 of the rear face of the lighting element, and at its other end it is oriented downwards.

What is claimed is:

1. A lighting or indicating apparatus for a motor vehicle, comprising:
a lighting element comprising a light source adapted to emit light, at least one reflector disposed and adapted to receive light from the light source and to reflect light into a beam, and a housing at least partially enclosing the light source and reflector which has a plurality of side faces,
a complementary module adapted to supply electricity to the light source and having an electronic printed circuit board and a plurality of electrical contact zones on a surface portion of the electronic circuit board,
wherein the lighting element further comprises at least one connector base adapted to interface with the complementary module and disposed in an aperture formed in the lighting element, said connector base comprising a plurality of terminals adapted to come into direct contact with the electrical contact zones of the complementary module,
wherein the connector base includes an aperture, in which the electronic circuit board is rooted and in which the set of terminals is disposed,
wherein the electrical contact zones are distributed over at least two faces of the complementary module, and are grouped in a first set of electrical contact zones, disposed on a first face of the electronic printed circuit board, and a second set of electrical contact zones disposed on a second face of the electronic circuit board, each contact zone of the first set of contact zones being connected electrically to a contact zone of the second set of contact zones,
wherein the set of contact zones and the set of terminals are associated in one-to-one relationship, the intermediate member including a first set of lugs in contact with the electrical contact zones of the first face of the electronic circuit board, and a second set of lugs in contact with the contact zones on the second face of the electronic circuit board, the two sets of lugs being joined at a common end which is sufficiently thin to be inserted and held between two terminals of the connector base.

2. An apparatus according to claim 1, wherein the complementary module is outside of the housing.

3. Apparatus according to claim 1, wherein insertion of the circuit board is reversible, the board being removable.

4. Apparatus according to claim 1, wherein elastic means are arranged between the connector base and at least one of the complementary module and the lighting unit.

5. Apparatus according to claim 1, including means co-operating with each other for centering the set of contact zones with respect to the set of terminals when the electronic circuit board comes to be inserted in the connector base.

6. Apparatus according to claim 1, wherein the complementary module is selected from the group consisting of a ballast of the xenon system type and a module comprising an electronic printed circuit, for managing at least one function associated with the lighting element.

7. Apparatus according to claim 1, wherein the complementary module and the lighting element are secured to each other by at least one means selected from the group consisting of one or more screws and at least one clipping means for clipping the complementary module on the lighting element.

8. Apparatus according to claim 1, wherein the complementary module and the lighting element are secured to each other by means of a spring for exerting pressure on a rear portion of the complementary module, whereby to maintain the electronic circuit board rooted in the aperture of the connector base.

9. Apparatus according to claim 1, including a first sealing means of the gasket type disposed in the aperture in such a way as to envelop a connecting terminal of the complementary module, thereby sealing the lighting apparatus.

10. Apparatus according to claim 1, including a second sealing means of the gasket type disposed in the aperture, whereby partially to envelop the connector base, thereby sealing a junction between the connector base and the complementary module.

11. Apparatus according to claim 1, including a third sealing means of the gasket type, disposed between a cover of the complementary module, which constitutes a lower portion of the complementary module, and a cap of the complementary module.

12. Apparatus according to claim 1, having a single power supply input for receiving a set of signals from outside the headlight apparatus, said signals being transmitted to the connector base through a first conductive link, while a second conductive link, internal to the lighting element, ensures transmission of signals between the connector base and a high tension module associated with the light source.

13. Apparatus according to claim 1, including at least one pair of assembly elements consisting of a guiding slide and a projecting element, the projecting element being adapted to be inserted in at least one end of the guiding slide with which it is paired, and to slide in said guiding slide, each of the assembly elements in a pair of assembly elements being disposed on one of the lighting element and a complementary module which is adapted to be associated with the lighting element, the two assembly elements in an assembly pair being disposed otherwise than together, on one of the lighting element and the complementary module.

14. Apparatus according to claim 13, having two pairs of assembly elements.

15. Apparatus according to claim 13, wherein each guiding slide is disposed on the lighting element, each projecting element of a pair of assembly elements being disposed on the complementary module.

16. Apparatus according to claim 13, wherein each guiding slide is disposed on the lighting element, each projecting element of a pair of assembly elements being disposed on the complementary module, and the guiding slides being disposed on walls of the lighting element which define the aperture.

17. Apparatus according to claim 13, wherein the set of contact zones and the set of terminals enter into contact with each other when at least one projecting element in an assembly pair is at the end of its course of travel within the guiding slide with which it is associated.

18. A motor vehicle equipped with a headlight apparatus according to claim 1.

19. A lighting or indicating apparatus for a motor vehicle, comprising:
a lighting element comprising a light source adapted to emit light, at least one reflector disposed and adapted to receive light from the light source and to reflect light into a beam, and a housing at least partially enclosing the light source and reflector which has a plurality of side faces,
a complementary module adapted to supply electricity to the light source and having an electronic printed circuit board and a plurality of electrical contact zones on a surface portion of the electronic circuit board,
wherein the lighting element further comprises at least one connector base adapted to interface with the complementary module and disposed in an aperture formed in the lighting element, said connector base comprising a plurality of terminals adapted to come into direct contact with the electrical contact zones of the complementary module,
wherein the apparatus further comprises a single power supply input for receiving a set of signals from outside the headlight apparatus, said signals being transmitted to the connector base through a first conductive link, while a second conductive link, internal to the lighting element, ensures transmission of signals between the connector base and a high tension module associated with the light source, and
wherein sealing means of the gasket type are arranged between the connector base and the conductive link.

20. Apparatus according to claim 19, wherein the electrical contact zones are distributed over at least two faces of the complementary module.

21. Apparatus according to claim 19, wherein the electrical contact zones are disposed on only one face of the complementary module.

22. Apparatus according to claim 19, wherein the electrical contact zones are distributed over at least two faces of the complementary module, and are grouped in a first set of electrical contact zones, disposed on a first face of the electronic printed circuit board, and a second set of electrical contact zones disposed on a second face of the electronic circuit board, each contact zone of the first set of contact zones being connected electrically to a contact zone of the second set of contact zones.

23. Apparatus according to claim 19, wherein the set of contact zones and the set of terminals are associated in one-to-one relationship.

24. Apparatus according to claim 19, wherein contact between each contact zone and the terminal with which said contact zone is adapted to connect is effected by means of at least one intermediate member which is at least partly conductive.

25. Apparatus according to claim 24, wherein said at least one intermediate member is fixed to the electronic circuit board, in particular by brazing or adhesive bonding, in such a way as to be in electrical continuity with the electrical contact zones of said electronic circuit board.

26. Apparatus according to claim 25, wherein said at least one intermediate member is a projecting element disposed on at least one of the faces of the electronic circuit board.

27. Apparatus according to claim 24, wherein the intermediate member is in electrical continuity with, and in particular is fixed to, electrical contact zones of the electronic circuit board.

28. Apparatus according to claim 27, wherein fastening of the metallic intermediate member and the electrical contact zones of the electronic circuit board to each other is obtained by a process selected from the group that consists of welding, brazing and adhesive bonding.

* * * * *

UNITED STATES PATENT AND TRADEMARK OFFICE
CERTIFICATE OF CORRECTION

PATENT NO. : 7,222,990 B2 Page 1 of 1
APPLICATION NO. : 10/771991
DATED : May 29, 2007
INVENTOR(S) : Duarte et al.

It is certified that error appears in the above-identified patent and that said Letters Patent is hereby corrected as shown below:

On the cover page at item (56) under *U.S. Patent Documents*, INSERT the following:

| | | |
|---|---|---|
| --"5,107,405 | 4/1992 | Makita |
| 5,119,275 | 6/1992 | Makita |
| 5,188,444 | 2/1993 | Makita |
| 5,343,370 | 8/1994 | Ohashi et al. |
| 5,382,876 | 1/1995 | Sugasawa et al. |
| 5,434,763 | 7/1995 | Hege et al. |
| 5,529,506 | 6/1996 | Onoda |
| 5,562,339 | 10/1996 | Tanaka et al. |
| 5,607,228 | 3/1997 | Ozaki et al. |
| 5,653,528 | 8/1998 | Schmidt |
| 5,700,079 | 12/1997 | Woerner et al. |
| 5,727,873 | 3/1998 | Tyson |
| 5,838,109 | 11/1998 | Kobayashi et al. |
| 5,879,073 | 3/1999 | Hori et al. |
| 5,895,113 | 4/1999 | Ozaki et al." |
| 6,008,584 | 12/1999 | Kodaira et al. |
| 6,043,614 | 3/2000 | Tessnow et al. |
| 6,072,277 | 6/2000 | Yamamoto et al. |
| 6,123,439 | 9/2000 | Hiranaka et al. |
| 6,176,604 | 1/2001 | Dubrovin et al. |
| 6,309,089 | 10/2001 | Yoneyama |
| 6,322,239 | 11/2001 | Nitta et al.-- |

On the cover page at item (56) under *Foreign Patent Documents*, INSERT the following:

--DE 41 33 002 A1 4/1993--

Signed and Sealed this

Seventeenth Day of July, 2007

JON W. DUDAS
*Director of the United States Patent and Trademark Office*